United States Patent [19]
Bader, deceased et al.

[11] 3,907,541
[45] Sept. 23, 1975

[54] PYRIDAZONYLPHOSPHORIC ACID DERIVATIVES AS HERBICIDES

[75] Inventors: Jörg Bader, deceased, late of Arlesheim, Switzerland; by Dagmar Bader-Ludwig, legal representative, Arlesheim, Switzerland

[73] Assignee: Ciba-Geigy Corporation, Ardsley, N.Y.

[22] Filed: Sept. 26, 1974

[21] Appl. No.: 509,628

Related U.S. Application Data

[62] Division of Ser. No. 296,428, Oct. 10, 1972, Pat. No. 3,853,870.

[30] Foreign Application Priority Data

Oct. 12, 1971  Switzerland.................... 14850/71

[52] U.S. Cl. .................................................. 71/86
[51] Int. Cl.$^2$........................................... A01N 9/36
[58] Field of Search ................................. 71/86, 92

[56] References Cited

UNITED STATES PATENTS

| | | | |
|---|---|---|---|
| 3,823,142 | 7/1974 | Bader et al. | 71/86 |
| 3,849,103 | 11/1974 | Harris et al. | 71/8 |

OTHER PUBLICATIONS

Kirsonov et al., Chem. Abs., Vol. 51, 1821–1822(b) (1957).
Kabachnik et al., Chem. Abs., Vol. 51, 1823(b) (1957).
Konecny et al., Chem. Abs. Vol. 77, 1972 62016(h).

*Primary Examiner*—James O. Thomas, Jr.
*Attorney, Agent, or Firm*—Frederick H. Rabin

[57] ABSTRACT

Phosphoric and thiophosphoric-diester-N-[1-phenyl-5-halogeno-6(1H)-pyridazonyl-(4)]-amides possess selective herbicidal properties. They can be used for combating grass-like and dicotyledonous weeds in useful plants.

10 Claims, No Drawings

PYRIDAZONYLPHOSPHORIC ACID DERIVATIVES AS HERBICIDES

This is a division of application Ser. No. 296,428 filed on Oct. 10, 1972, now U.S. Pat. No. 3,853,870.

The present invention relates to new 1-phenyl-pyridazonylphosphoric acid derivatives, a process for their manufacture, also to herbicidal agents which contain these new compounds as active substances, and to a method of combating grass-like and dicotyledonous weeds, which comprises the use of the new substances or of agents which contain them.

The new active substances are phosphoric and thiophosphoric-diester-N-[1-phenyl-5-halogeno-6(1H)-pyridazonyl-(4)]-amides of the formula I:

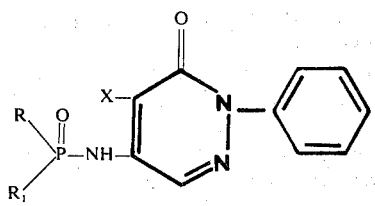
(I)

wherein R and $R_1$ independently represent alkoxy or alkylthio radicals, halogenoalkoxy or alkenyloxy radicals each containing at least 4 carbon atoms, or both together with the phosphorus atom represent a five-membered heterocyclic ring with 2 oxygen atoms, and X represents chlorine or bromine.

Alkoxy radicals R and $R_1$ contain 1 to 4 and alkenyloxy radicals contain 3 to 4 carbon atoms. Examples of suitable radicals are methoxy, ethoxy, n-propoxy, isopropoxy, n-butoxy, sec. butoxy, tert-,butoxy or allyloxy. These radicals may substituted once or more than once by halogen, preferably chlorine; the 2-chloroethoxy radical is preferred. Alkylthio radicals R and $R_1$ also contain 1 to 4 carbon atoms, such as methylthio, ethylthio, n- and isopropylthio and the various butylthio radicals.

Preferably, the radicals R and $R_1$ are identical.

The new pyridazonylphosphoric acid derivatives are manufactured according to the present invention by treating a 1-phenyl-pyridazone derivative of the formula II

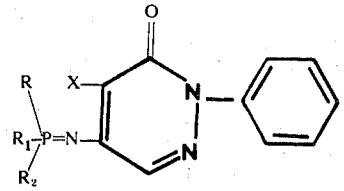
(II)

in which R, $R_1$ and X have the meanings given under formula I and $R_2$ represents a radical which may at least be partially split off, namely an optionally halogenated alkoxy, alkenyl or alkylthio radical, with an acid or base, optionally in the presence of water and/or an organic solvent, and isolating the end product of the formula I from the reaction mixture.

As a rule the process is carried out either with aqueous acids or bases, or water is added to the reaction mixture before the working up. In this case the entire radical $R_2$ is split off by hydrolysis. If $R_2$ is an alkoxy or alkenyloxy radical, it is also possible to use concentrated aqueous hydrochloric acid or anhydrous hydrohalic acid as acid in organic solvents. In this case alkyl halide or alkenyl halide is then split off and the oxygen atom of the alkoxy group remains at the phosphorous atom.

The method is known and is described, for example, in Chem. Abstr. 51, 1823.

The starting materials of the formula II and their manufacture are described in Swiss patent application No. 18554/70 or in Belgian Pat. Spec. No. 776,660. They are obtained from the corresponding 1-phenyl-4-azido-5-halogeno-6(1H)-pyridazones (U.S. Pat. No. 3 210 354 and Chem. Abstr. 70, 47382 m) by reaction with phosphites of the formula

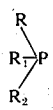

wherein R, $R_1$ and $R_2$ are defined as under the formula II.

For the reaction according to the invention of the starting materials of the formula II it is possible to use as acids any inorganic or organic acids, provided they do not appreciably attack other positions of the molecule of the starting materials under the prevailing reaction conditions, i.e., for example that they do not have a strongly nitrating or sulphurating action. Exemplary of inorganic acids are: aqueous or anhydrous (in organic solvents) hydrogen chloride or hydrogen bromide, dilute perchloric acid, dilute nitric or sulphuric acid, sulphurous acid, phosphoric acid, diphosphoric acid, polyphosphoric acids, and partially esterified sulphuric and phosphoric acids.

As examples of organic acids there may cited: acetic acid, propionic acid, formic acid, pivalic acid, oxalic acid, nitrobenzoic acids, chloroacetic acid, chlorinated benzoic acids, sulphonic acids, such as methanesulphonic acids, ethanesulphonic acid, aromatic sulphonic acids, for example of substituted benzene, phosphonic acids and phosphinic acids such, for example, as chloromethanephosphonic acid, diphenylphosphinic acid. As examples of further organic compounds which have acid reaction there may be mentioned phenols, in particular phenols substituted by chlorine and/or nitro groups, and also ion exchangers.

Instead of acids, it is also possible to carry out the reaction with inorganic or organic bases. Exemplary of inorganic, preferably aqueous, bases are: the hydroxides of alkali and alkaline earth metals, such as NaOH, KOH, $Ca(OH)_2$, $Ba(OH)_2$ and $NH_4OH$, also salts of basic reaction, such as sodium bicarbonate, sodium hydrogen carbonate, potassium carbonate, trisodium phosphate, also basic ion exchangers.

The application concentrations depend upon the kind of acid or base used: in the case of stronger acids or bases catalytic amounts suffice, for example 0.05 molar equivalents of 5% sulphuric acid, but larger amounts may also be used, for example equivalent amounts or more. In the case of weak acids or bases, for example acetic acid or potassium carbonate, higher concentrations, for example 1–5 molar equivalents, are expediently used.

As solvents or diluents it is possible to use water, organic solvents or mixtures of the two, or also an excess of the acid used. Stronger acids possess the advantage that, when used in sufficiently large excess, they dissolve the reaction products, which then can be precipitated by dilution with water.

Additional examples of solvents and diluents are: alcohols, such as methanol, ethanol, isopropanol, 2-methoxyethanol, benzyl alcohol; ethers, such as diethyl ether, 1,2-dimethoxyethane, 2,2-dimethoxy-diethyl ether, dioxan, tetrahydrofuran; amides, such as dimethyl formamide, hexamethylphosphoric triamide, formamide, sulphoxides and sulphones, such as diemthyl sulphoxide or tetramethylenesulphone; esters, such as ethyl acetate, ethyl formylate; aromatic or aliphatic, optionally chlorinated or otherwise substituted hydrocarbons, such as toluene, chlorobenzene, xylene, nitrobenzene, methylene chloride, dichloroethylene.

The reaction conditions depend upon the acid or base used and are to be so chosen that a continuing saponification of the molecule, for example the splitting off of the phosphoric ester radical, is avoided. The reaction temperatures may be from −50°C to 120°C and the reaction times from a few seconds to several days. In this connection, however, the stronger the acid or base used and the greater the concentration of the acid or base, the shorter the reaction times and the lower the temperatures chosen will be. For example, it is expedient to keep a reaction temperature of below 25°C when using concentrated hydrochloric acid.

The conditions being suitably chosen, the formation of the end products I is always the preferred reaction step, since it proceeds very much more easily than other possible hydrolysis reactions at the compounds of the formulae II and I.

According to a further process, it is also possible to manufacture the new pyridazonylphosphoric acid derivatives of the formula I by reacting a 1-phenyl-4-amino-5-halogeno-6(1H)-pyridazone of the formula III

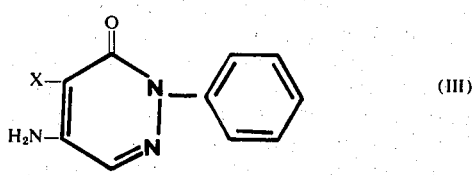

in which X represents chlorine or bromine, if need be in the presence of a base in a solvent, e.g., chlorobenzene, with a phosphoric or thiophosphoric diester chloride of the formula IV

in which R and $R_1$ are defined as under formula I.

The two 1-phenyl-4-amino-5-chloro(or 5-bromo)-6(1H)-pyridazones used as starting materials of the formula III are known from the literature (German Auslegeschrift No. 1,105,232) and may be manufactured as described therein. Phosphoric ester chlorides of the formula IV are also known compounds.

Instead of reacting the starting material of the formula III with a phosphoric diester chloride of the formula IV, it is also possible to convert it with phosphoroxy chloride ($POCl_3$) into the corresponding

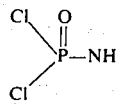

derivative and to react this latter with aliphatic alcohols and/or mercaptans to give the end products of the formula I.

The following Examples illustrate the manufacture of the new 1-phenyl-pyridazonyl-phosphoric acid derivatives of the formula I.

EXAMPLE 1

7.8 g of 1-phenyl-4-(trimethoxy-phosphoranylideneamino)-5-bromo-6(1H)-pyridazone are finely pulverised and, while stirring, charged within 2 minutes in small amounts into 12 ml of 35% hydrochloric acid. The substance dissolves while foaming. Then about 30 g of ice-water mixture are added, in the process of which the reaction product falls out as a resin. It is decanted and washed twice with water, then 10 ml of isopropanol are added and the product is crystallised by rubbing with a glass rod. The product is filtered with suction and recrystallised from a small amount of methanol to give about 6 g of O,O-dimethyl-N-(1-phenyl-5-bromo-6(1H)-pyridazon-4-yl)-phosphoric diester amide in the form of colourless crystals with a melting point of 140°–142°C (compound No. 1).

EXAMPLE 2

5.0 g of 1-phenyl-4-(trimethoxy-phosphoranylideneamino)-5-bromo-6(1H)-pyridazone are added at room temperature to 10 ml of 50% phosphoric acid. Sufficient 1,2-dimethoxyethane is added to form a homogeneous solution, which is left to stand for 5 minutes. The bulk of the dimethoxyethane is distilled off at 25°C bath temperature under reduced pressure. The distillation residue is treated with an ice-water mixture and further processing is carried out as described in Example 1 to give once more O,O-dimethyl-N-(1-phenyl-5-bromo-6(1H)-pyridazon-4-yl)-phosphoric diester amide which melts at 138°–141°C.

EXAMPLE 3

5.0 g of finely pulverised 1-phenyl-4-(trimethoxyphosphoranylidene-amino(-5-bromo-6(1H)-pyridazone are whirled at 15°C with 80% acetic acid until complete solution occurs (about 1 minute). The reaction product is then precipitated with ice-water and further processing is carried out as described in Example 1 to give likewise the end product of Examples 1 and 2 (melting point: 136°–140°C).

EXAMPLE 4

6.0 g of 1-phenyl-4-(trimethoxy-phosphoranylideneamino)-5-bromo-6(1H)-pyridazone are dissolved in a mixture of 15 ml of methanol and 15 ml of 1,2-dimethoxyethane. A solution of 0.7 g of sodium hydroxide in 3 ml of water is added and the mixture is left to stand for 15 hours. It is then neutralised by addition of a small amount of glacial acetic acid and evaporated. The residue is dissolved in acetone and undissolved sodium acetate is filtered off. Column chromatography on silica gel and recrystallisation from methanol yield once again O,O-dimethyl-N-(1-phenyl- 5-bromo-6-(1H)-pyridazon-4-yl)-phosphoric diester amide which melts at 141°–142°C.

EXAMPLE 5

6.0 g of finely pulverised 1-phenyl-4-(tris-methylthio-phosphoranylidene-amino)-5-bromo-6(1H)-pyridazone are stirred with 12 ml of 35% hydrochloric acid at 0°–5°C until complete solution occurs (about 15 minutes). The solution is then treated with ice and worked up as described in Example 1 to give 3.8 g of S,S-dimethyl-N-(1-phenyl-5-bromo-6-(1H)-pyridazon-4-yl)-dithiophosphoric diester amide in the form of fine, colourless needles with a melting point of 156°–158°C (compound No. 2).

The following Table lists further active substances of the formula I

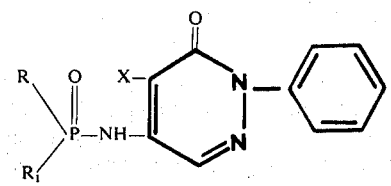

which were manufactured according to the processes described in the preceding Examples:

| COMPOUND No. | R | $R_1$ | X | Melting Point |
|---|---|---|---|---|
| 3 | $CH_3O-$ | $CH_3O-$ | Cl | 147 – 148° |
| 4 | $C_2H_5O-$ | $C_2H_5O-$ | Cl | 100 – 101° |
| 5 | $CH_3S-$ | $CH_3S-$ | Cl | 162 – 164° |
| 6 | allyl—O— | allyl—O | Cl | |
| 7 | allyl—O— | allyl—O | Br | 112 – 113° |
| 8 | $C_2H_5O-$ | $C_2H_5O-$ | Br | |
| 9 | $Cl-CH_2-CH_2-O-$ | $Cl-CH_2-CH_2-O-$ | Br | |
| 10 | n—butyl—O— | n—butyl—O— | Br | |
| 11 | n—propyl—O— | n—propyl—O— | Br | |
| 12 | n—propyl—O— | n—propyl—O | Cl | |
| 13 | ⌐O   O⌐ \/ | | Cl | |
| 14 | ⌐O   O⌐ \/ | | Br | |

The new 1-phenyl-pyridazonyl-phosphoric acid derivatives are stable compounds which are more readily soluble in organic solvents than the phenylpyridazone derivatives hitherto known as herbicidally active (e.g., German Auslegeschrift No. 1,105,232); this constitutes an important advantage.

The pyridazone derivatives of the formula I possess excellent herbicidal properties and are suitable in particular for combating grass-like and latifoliate weeds in various crop plant cultures. When used in high concentrations the new compounds act as total herbicides; on the other hand, when used in lower concentrations they act as selective herbicides. Deep rooted, difficultly combattable weeds which are one or more years old are successfully damaged in their growth or destroyed by the active substances of the formula I. The new active substances can be applied with the same good success before germination (preemergence) and after germination (postemergence). Thus meadow weeds, for example millet species (Panicum spp.), mustard species (Chenopodiaceae), slender foxtail (alopecurus spp.) and other foxtail species, e.g., Amarantus spp., grasses, e.g., Lolium spp., Compositae, e.g., Taraxacum spp., camomile species (Matricaria spp.), are destroyed or hindered in their growth without damage being caused to cultivated plants, such as cereals, maize, cotton, sorghum, soya beans and sugar beet. The rates of application vary and are dependent on the time of application; they are between 0.1 to 10 kg of active substance per hectare, on preemergence application up to 1 kg per hectare and on postemergence 3 to 10 kg of active substance per hectare. In order to totally destroy entire crops of weeds, for example on fallow land neighbouring on the cultivated areas, it is necessary to use more than 10 kg per hectare. The usual crop rotation may proceed on application of the new active substances without any detrimental effects.

In low concentrations the active substances of the formula I also possess plant growth regulating properties.

HERBICIDAL ACTION ON APPLICATION BEFORE GERMINATION OF THE PLANTS (PREEMERGENCE APPLICATION)

In a greenhouse the active substance is sprayed in the form of an aqueous solution of a wettable powder concentrate on containers with meadow soil. A number of test plants from the following group are sown into the thus prepared soil:

1) <u>Weeds:</u>
a: *Alopecurus myosuroides*
b: *Poa annua*
c: *Setaria italica*
d: *Avena fatua*
e: *Lolium perenne*
f: *Digitaria sanguinalis*
g: *Stellaria media*
h: *Echinochloa*
i: *Sinapis alba*
k: *Chenopodium*
l: *Sesbania exeltata*
m: *Amaranthus retroflexus*
n: *Chrysanthenum leucotrichum*
o: *Ipomoea purpurea*
p: *Galium aparine*
q: *Pastinaca sativa*

2) <u>Cultures:</u>
A= maize (*Zea mays*)
B= cotton (*Gossypium*)
C= sugar beet (*Beta*)
D= sorghum
E= soya (*Glycine*)

The containers are then kept at 22°–25°C and 50 to 70% relative humidity in daylight.

The evaluation of the tests is carried out after 28 days. The results are given in the Table below.

Rating:
9 = plants undamaged = control
1 = plants died
2–8 = intermediate stages of damage
- = not tested Composition of the wettable powder concentrate 10 parts of active substance, 0.6 part of sodium dibutylnaphthalenesulphonate, 1 part of naphthalenesulphonic acid/phenolsulphonic acid/formaldehyde condensate (3:2:1), 10 parts of sodium aluminium silicate, 78.4 parts of china clay.

and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (car-

| No. | A | B | C | D | E | a | b | c | d | e | f | g | h | i | k | l | m | n | o | p | q |
|---|---|---|---|---|---|---|---|---|---|---|---|---|---|---|---|---|---|---|---|---|---|
| 1 | — | — | 8 | — | — | 1 | 1 | 1 | 2 | 2 | 2 | 1 | 2 | 1 | 3 | 1 | 1 | 1 | 2 | 2 |   |
| 2 | — | 7 | 8 | — | — | 1 | — | 1 | 1 | 2 | 1 | — | 1 | 1 | — | 1 | 1 | 1 | 1 | 2 | 1 |
| 3 | 9 | 8 | 9 | 7 | 8 | 3 | 4 | 3 | — | — | 2 | — | 5 | 2 | — | 2 | 1 | 2 | 4 | — | 3 |
| 5 | 9 | 7 | 8 | 7 | 7 | 3 | — | 3 | — | — | 4 | 4 | 3 | 3 | — | 4 | 2 | 2 | — | 4 | — |

The herbicidal agents are manufactured by mixing the active substances with suitable carriers and/or dispersing agents. In order to broaden the activity spectrum it is possible to add to these agents still other herbicides, for example from the series of the triazines, such as halogeno-diamino-s-triazines, alkoxy- and alkylthio-diamino-s-triazines, such as uraciles, aliphatic carboxylic acids and halogenocarboxylic acids, halogenated benzoic acids and phenylacetic acids, aryloxyalkanecarboxylic acids, hydrazides, amides, nitriles, esters of such carboxylic acids, carbamic acids and thiocarbamic acids, urea, etc.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms:
 dusts, tracking agents, granules, coated granules, impregnated granules and homogeneous granules.

Liquid forms:
a. active substances which are dispersible in water: wettable powders, pastes, emulsions;
b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomacous earth, precipitated silica, alkaline earth silicates, sodium and potassium aluminum silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal, etc. These substances can either be used alone or in admixture with one another.

The particle size of the carriers for dusts is advantageously up to about 0.1 mm, for tracking agents from about 0.075 to 0.2 mm, and for granules 0.2 mm or larger.

The solid forms contain the active substances in concentrations from 0.5 to 80%.

To these mixtures can also be added additives which stabilize the active substance and/or non-ionic, anionic bowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, concentration products of urea and formaldehyde, and also latex products.

The water-dispersible concentrates of the active substance, i.e., wettable powders, pastes and amulsifiable concentrates, are agents which can be diluted with water to any concentration desired. They consist of active substance, carrier, optionally additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulphonated naphthalene and sulphonated naphthalene derivatives with formaldehyde, condensation products of naphthalene or naphthalene sulphonic acids with phenol and formaldehyde, as well as alkali, ammonium and alkaline earth metal salts of lignin sulphonic acid, in addition, alkylaryl sulphonates, alkali and alkaline earth metal salts of dibutyl naphthalene sulphonic acid, fatty alcohol sulphates such as salts of sulphated hexadecanols, heptadecanols, octadecanols, and salts of sulphated fatty alcohol glycol ethers, the sodium salt of oleoyl ethionate, the sodium salt of olcoyl methyl tauride, ditertiary acetalene glycols, dialkyl dilauryl ammonium chloride and fatty acid alkali and alkaline earth metal salts.

Suitable anti-foam agents are silicones.

The active substances are so mixed, ground sieved and strained with the additives mentioned above that, in wettable powders, the solid particle size of from 0.02 to 0.04 and in pastes, of 0.03 is not exeeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulphoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substances or several active substances of general formula II are dissolved in suitable organic solvents, mixtures of solvents or in water. Aliphatic and aromatic hydrocarbons, chlorinated derivatives thereof, alkyl naphthalenes and mineral oils alone and mixed with each other, can be used as organic solvents.

In addition to fungicidal active substances, the agents described according to the invention can be mixed with other biocidally active substances or agents. Thus in order to broaden the activity spectrum the new agents may contain, for example, insecticides, fungicides, bactericides, fungistatics, bacteriostatics or nematocides, in addition to the cited compounds of the formula I. The agents according to the invention may also contain plant fertilisers, trace elements etc.

The active substances of the formula I can, for example, be formulated as follows. The parts denote parts by weight.

Granules

The following substances are used to manufacture 5% granules:
- 5 parts of O,O-dimethyl-N-[1-phenyl-5-bromo-6(1H)-pyridazonyl-(4)]-phosphoric diester amide,
- 0.25 parts of epichlorohydrin,
- 0.25 parts of cetyl polyglycol ether,
- 3.50 parts of polyethylene glycol ether,
- 91 parts of kaolin (particle size: 0.3–0.8 mm).

The active substance is mixed with epichlorohydrin and the mixture dissolved in 6 parts of acetone, then polyethylene glycol ether and cetyl polyglycol ether are added. The resulting solution is sprayed on kaolin and then evaporated in vacuo.

Wettable Powder

The following consituents are used to manufacture (a) a 50%, (b) a 25% and (c) a 10% wettable powder:
a. 50 parts of O,O-diethyl-N-[1-phenyl-5-chloro-6(1H)-pyridazonyl-(4)]-phosphoric diester amide,
  5 parts of sodium dibutylnaphthalene sulphonate,
  3 parts of naphthalenesulphonic acid/phenolsulphonic acid/formaldehyde condensate (3:2:1),
  20 parts of kaolin,
  22 parts of Champagne chalk;
b. 25 parts of S,S-dimethyl-N-[1-phenyl-5-bromo-6(1H)-pyridazonyl-(4)]-dithiophosphoric diester amide,
  5 parts of sodium oleylmethyltauride,
  2.5 parts of naphtalenesulphonic acid/formaldehyde condensate,
  0.5 part of carboxymethyl cellulose,
  5 parts of neutral potassium aluminium silicate,
  62 parts of kaolin;
c. 10 parts of O,O-dimethyl-N-[1-phenyl-5-chloro-6(1H)pyridazonyl-(4)]-phosphoric diester amide,
  3 parts of a mixture of the sodium salts of saturated fatty alcohol sulphates,
  5 parts of naphtalenesulphonic acid/formaldehyde condensate,
  82 parts of kaolin.

The indicated active substance is applied to the corresponding carriers (kaolin and chalk) and then these are mixed and ground, to yield wettable powders of excellent wettability and having an excellent capacity for forming suspension. By diluting these wettable powders with water it is possible to obtain suspensions of every desired concentration of active substance. Such suspensions are used for combating weeds and grasses in crops of cultivated plants.

Paste

The following substances are used to manufacture a 45% paste:
- 45 parts of O,O-dimethyl-N-[1-phenyl-5-bromo-6(1H)-pyridazonyl-(4)]-phosphoric diester amide,
- 5 parts of sodium aluminium silicate,
- 14 parts of cetyl polyglycol ether with 8 mols of ethylene oxide,
- 1 part of oleyl polyglycol ether with 5 mols of ethylene oxide,
- 2 parts of spindle oil,
- 10 parts of polyethylene glycol,
- 23 parts of water.

The active substance is intimately mixed with the addition in appropriate devices and ground. A paste is obtained from which, by diluting it with water, is possible to manufacture suspensions of every desired concentration of active substance. The suspensions are suitable for treating vegetable plantations.

Emulsion Concentrate

To manufacture a 25% emulsion concentrate
- 25 parts of S,S-dimethyl-N-[1-phenyl-5-bromo-6(1H)-pyridazonyl-(4)]-dithiophosphoric diester amide,
- 5 parts of a mixture of nonylphenolpolyoxyethoxyethylene and calcium, dodecylenesulphonate,
- 35 parts of 3,5,5-trimethyl-2-cyclohexan-1-one,
- 35 parts of dimethyl formamide, are mixed together. This concentrate can be diluted with water to give emulsions in desired concentrations. Such emulsions are suitable for combating weeds in crops of cultivated plants, e.g., cotton, maize, sugar beet.

We claim:

1. A herbicidal agent for combating monocotyledonous and dicotyledonous weeds in cultures of crop plants, which, in addition to dispersing agents and/or other carriers, contains as active component an effective amount of a 1-phenyl-pyridazonylphosphoric acid derivative of the formula

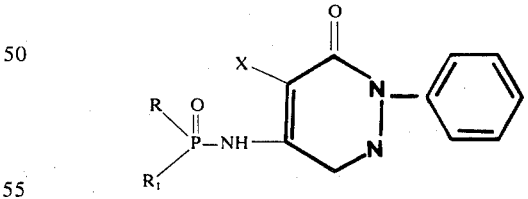

wherein each of R and $R_1$ independently represents alkoxy of from 1 to 4 carbon atoms, alkylthio of from 1 to 4 carbon atoms, halogenoalkoxy of from 1 to 4 carbon atoms or alkenyloxy of 3 or 4 carbon atoms, or both together represent an oxyethyleneoxy bridge, and X represents chlorine or bromine.

2. A herbicidal agent according to claim 1, wherein R and $R_1$ are identical.

3. A herbicidal agent according to claim 1, which contains as active component O,O-dimethyl-N-[1-phenyl-5-bromo-6(1H)-pyridazonyl-(4)]-dithiophosphoric diester amide.

4. A herbicidal agent according to claim 1, which contains as active component S,S-dimethyl-N-[1-phenyl-5-bromo-6(1H)-pyridazonyl-(4)]-dithiophosphoric diester amide.

5. A herbicidal agent according to claim 1, which contains as active component O,O-diethyl-N-[1-phenyl-5-bromo-6(1H)-pyridazonyl-(4)]-phosphoric diester amide.

6. A method of combating undesirable plant growth in cultures of crop plants, which comprises applying to said cultures a herbicidally effective amount of a compound of the formula

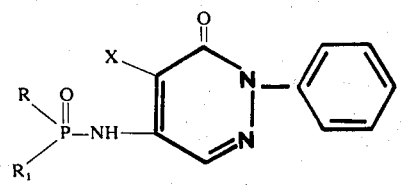

wherein each of R and $R_1$ independently represents alkoxy of from 1 to 4 carbon atoms, alkylthio of from 1 to 4 carbon atoms, halogenoalkoxy of from 1 to 4 carbon atoms or alkenyloxy of 3 or 4 carbon atoms, or both together represent an oxyethyleneoxy bridge, and X represents chlorine or bromine.

7. A method according to claim 6 in which R and $R_1$ are identical.

8. A method according to claim 7 in which the compound is O,O-dimethyl-N-[1-phenyl-5-bromo-6(1H)-pyridazonyl-(4)]-dithiophosphoric diester amide.

9. A method according to claim 7 in which the compound is S,S-dimethyl-N-[1-phenyl-5-bromo-6(1H)-pyridazonyl-(4)]-dithiophosphoric diester amide.

10. A method according to claim 7 in which the compound is O,O-diethyl-N-[1-phenyl-5-bromo-6(1H)-pyridazonyl-(4)]-phosphoric diester amide.

* * * * *